(12) United States Patent
Yamashita

(10) Patent No.: US 8,510,736 B2
(45) Date of Patent: Aug. 13, 2013

(54) COMPUTER SYSTEM, INFORMATION PROCESSING APPARATUS, AND SECURITY PROTECTION METHOD

(75) Inventor: Takumi Yamashita, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 26 days.

(21) Appl. No.: 13/118,063

(22) Filed: May 27, 2011

(65) Prior Publication Data

US 2012/0054745 A1 Mar. 1, 2012

(30) Foreign Application Priority Data

Aug. 26, 2010 (JP) ................................ 2010-189843

(51) Int. Cl.
*G06F 9/455* (2006.01)
*G06F 9/46* (2006.01)
*G06F 15/16* (2006.01)
*G06F 15/173* (2006.01)
*G06F 13/00* (2006.01)

(52) U.S. Cl.
USPC ............... 718/1; 718/104; 709/203; 709/225; 709/226; 711/163

(58) Field of Classification Search
USPC ...... 711/100–173; 718/1–105; 709/201–203, 709/223–226
See application file for complete search history.

(56) References Cited

U.S. PATENT DOCUMENTS

| | | | |
|---|---|---|---|
| 2003/0217278 A1 | 11/2003 | Kimura et al. | |
| 2008/0222633 A1* | 9/2008 | Kami | 718/1 |
| 2008/0271033 A1 | 10/2008 | Kamura | |
| 2009/0172165 A1* | 7/2009 | Rokuhara et al. | 709/226 |
| 2009/0216975 A1* | 8/2009 | Halperin et al. | 711/162 |
| 2009/0217265 A1* | 8/2009 | Ishikawa | 718/1 |
| 2010/0131957 A1* | 5/2010 | Kami | 718/104 |
| 2010/0228887 A1* | 9/2010 | Koike | 710/9 |
| 2010/0275205 A1* | 10/2010 | Nakajima | 718/1 |
| 2010/0299422 A1* | 11/2010 | Hirai | 709/223 |
| 2011/0099248 A1* | 4/2011 | Uchida | 709/218 |
| 2011/0185355 A1* | 7/2011 | Chawla et al. | 718/1 |

FOREIGN PATENT DOCUMENTS

| | | |
|---|---|---|
| JP | 2003-337736 | 11/2003 |
| JP | 2004-320349 | 11/2004 |
| JP | 2008-276546 | 11/2008 |
| JP | 2009-134551 | 6/2009 |
| JP | 2009-176265 | 8/2009 |
| JP | 2009-237997 | 10/2009 |

OTHER PUBLICATIONS

Japanese Patent Application No. 2010-189843; Notice of Reasons for Rejection; Mailed Jul. 26, 2011 (with English translation).
Japanese Patent Application No. 2010-189843; Notice of Reasons for Rejection; Mailed Oct. 11, 2011 (with English translation).

\* cited by examiner

*Primary Examiner* — Abdullah Al Kawsar
(74) *Attorney, Agent, or Firm* — Blakely, Sokoloff, Taylor & Zafman LLP

(57) ABSTRACT

According to one embodiment, a computer system includes a server and a client computer. The client computer is connected to the server via a network. The server includes a takeout management module configured to issue a permit to the client computer when a takeout request is received from the client computer. The permit permits the client computer to store data. The takeout request requests using of data acquired via the network under a condition of being disconnected from the network. The client computer includes a disk device, a takeout request transmitter and a security protector. The takeout request transmitter is configured to transmit the takeout request to the server. The security protector is configured to enable the disk device to store data when the permit is received from the server.

19 Claims, 4 Drawing Sheets

COMPUTER SYSTEM, INFORMATION PROCESSING APPARATUS, AND SECURITY PROTECTION METHOD

CROSS-REFERENCE TO RELATED APPLICATIONS

This application is based upon and claims the benefit of priority from Japanese Patent Applications No. 2010-189843, filed Aug. 26, 2010; the entire contents of which are incorporated herein by reference.

FIELD

Embodiments described herein relate generally to security protection techniques suitable for, for example, a computer system that manages business data with a file server on an in-house local area network (LAN).

BACKGROUND

In recent years, work has become increasingly computerized in various areas of business. In an office or similar environment, it has become common practice for employees to carry out tasks with personal computers and for business data to be managed in an integrated manner with a server computer called a file server on an in-house LAN.

Meanwhile, the fact that business data on the server flows through an employee's personal computer, known as a client, has become a social issue. Against this background, various mechanisms for preventing data from leaking from the client have been proposed.

A thin-client method, which is one solution to data leakage, prevents data from leaking from a client by preventing the client from holding data and allowing only a server on a network to hold the data. Specifically, a measure is taken not to give the client authority to write data to its own hard disk drive (HDD) or the like.

As well as the thin-client method, there is a method of assuring security by creating a special region, such as a partition or a file, for storing business data in a client and setting a password to access the region.

With the thin-client method, however, the user of a client cannot access data unless the client is connected to a server over a network. Therefore, for example, a salesperson or the like cannot take out necessary business data and make a presentation using the business data in front of customers, which is inconvenient.

In addition, with a method other than the thin-client method, since the operating system (OS) that accepts a user operation on a client can access the region, the risk of data being stolen illegally by password analysis or the like cannot be eliminated.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, a computer system includes a server and a client computer. The client computer is connected to the server via a network. The server includes a takeout management module configured to issue a permit to the client computer when a takeout request is received from the client computer. The permit permits the client computer to store data. The takeout request requests using of data acquired via the network under a condition of being disconnected from the network. The client computer includes a disk device, a takeout request transmitter and a security protector. The takeout request transmitter is configured to transmit the takeout request to the server. The security protector is configured to enable the disk device to store data when the permit is received from the server.

Figure 1:
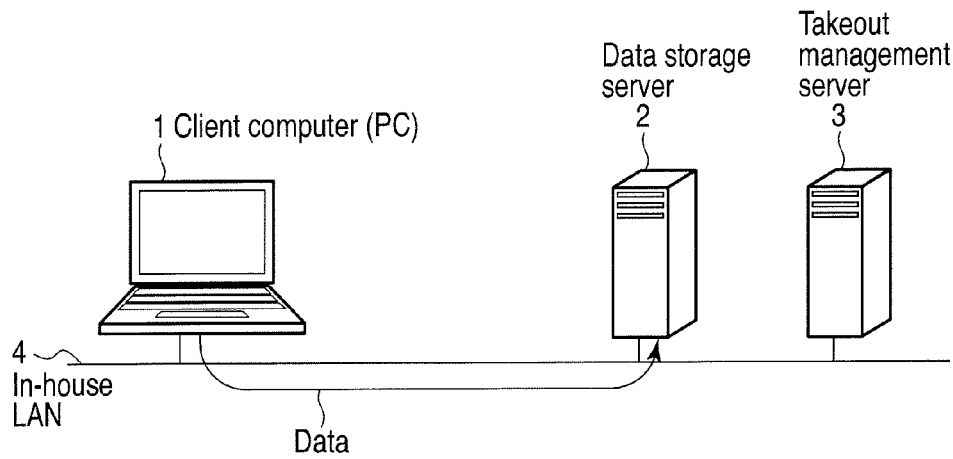
FIG. 1 is an exemplary view showing a configuration of a computer system according to an embodiment.

FIG. 1 is an exemplary view showing a configuration of a computer system according to an embodiment.

As shown in FIG. 1, a client computer 1, a data storage server 2, and a takeout management server 3 are connected to an in-house LAN 4, thereby configuring the computer system. The client computer 1 is a personal computer (PC) used by each employee. The client computer 1 can read data in the data storage server 2 connected via the in-house LAN 4 or write data to the data storage server 2. The data storage server 2 is, for example, a data management server called a file server. In the computer system, the client computer 1 is basically not given the authority to write data to its own HDD or the like equipped as, for example, a start-up disk. That is, data read from the data storage server 2 is prevented from being stored on the HDD or the like on the client computer 1 side. In this respect, it can be said that the computer system employs a so-called thin-client method.

Therefore, the client computer 1 cannot use data in the data storage server 2 at all in a so-called stand-alone condition under which the client computer 1 is disconnected from the in-house LAN 4, which might impair convenience all the more. To overcome this problem, the computer system includes the mechanism for enabling the client computer 1 to hold data in the data storage server 2 even when the client computer 1 is disconnected from the in-house LAN 4 under a specific condition, while assuring security. This will be described in detail below.

In the computer system, there is provided a takeout management server 3 to enable the stand-alone client computer 1 to hold data in the data storage server 2, in other words, to enable the client computer 1 to take out data in the data storage server 2. For ease of explanation, the data storage server 2 and the takeout management server 3 have been provided separately. However, the function of the data storage server 2 and that of the takeout management server 3 may be provided in parallel on a single server.

Here, an outline of the mechanism for causing the client computer 1 to cooperate with the takeout management server 3 to enable the client computer 1 to take data in the data storage server 2 out of the range of the in-house LAN 4 in the computer system will be explained with reference to FIG. 2.

For example, consider a case where a salesperson makes a presentation using data in the data storage server 2 (with the salesperson's client computer 1) in front of customers. In this case, the salesperson has to take out data in the data storage server 2 by use of the salesperson's client computer 1.

Figure 2:
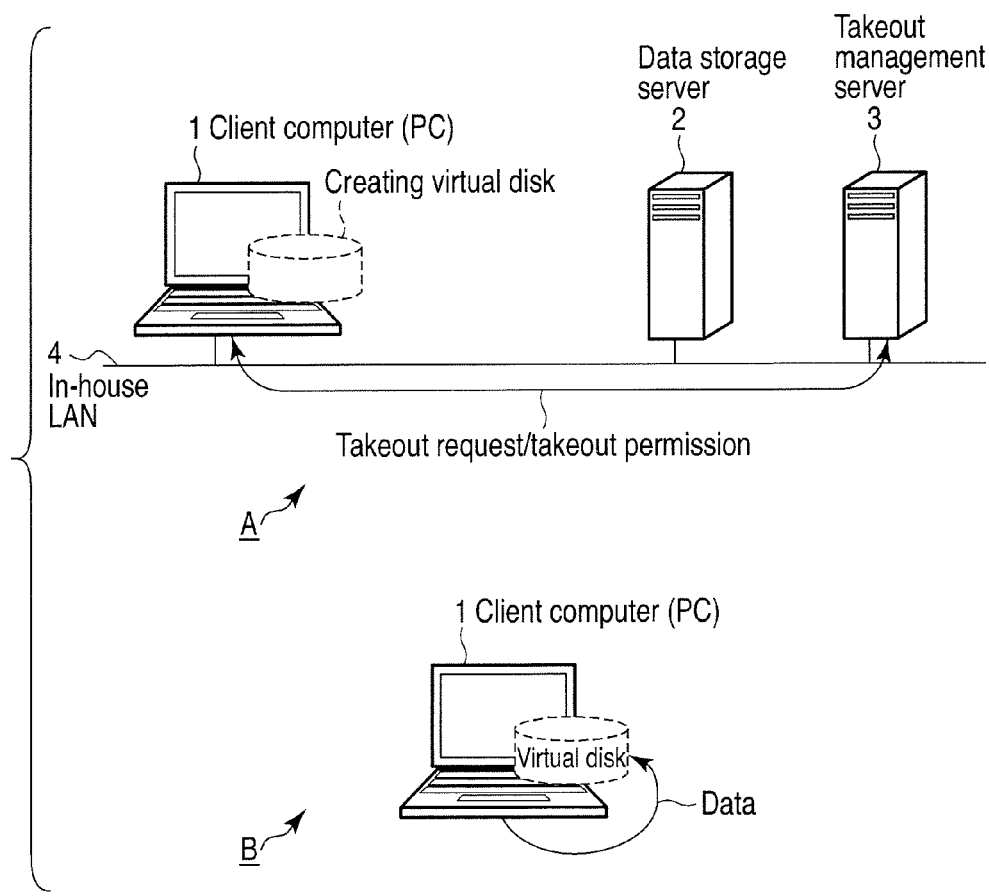
FIG. 2 is an exemplary diagram to explain an outline of the mechanism for enabling a client to take out data in a data storage server in the computer system of the embodiment.

In such a case, first, the client computer 1 transmits a takeout request to the takeout management server 3 in the computer system as shown in "A" in FIG. 2. Receiving the takeout request, the takeout management server 3 records identification data, time data, and others about the requesting client computer 1 and then issues a permit that permits data in the data storage server 2 to be taken out and sends back the permit to the client computer 1 ("takeout permission" in the figure). As a result, the takeout management server 3 records when and who applied a takeout request and others, thereby assuring security.

The client computer 1 connected to the in-house LAN 4 has been generally subjected to a specific authentication process before being connected to the in-house LAN 4. Therefore, the client computer 1 that has transmitted the takeout request via the in-house LAN 4 is sufficiently reliable. In addition, the client computer 1 may be subjected to an authentication process uniquely at the takeout management server 3.

Having received the permit from the takeout management server 3, the client computer 1 creates a virtual disk. The virtual disk will be described later. The following is a brief explanation of the virtual disk. On the client computer 1 (supplied to each employee), a virtual machine monitor environment for virtualizing physical hardware has been established. When the permit is received, a virtual disk image file is created on the HDD (to which the authority to write data has not been given). In the virtual machine monitor environment, the virtual disk image file is recognized by a host system as if it were a partition of the HDD (hereinafter, referred to as a virtual disk).

In addition, a virtual bus for accessing the virtual disk is provided in the virtual machine monitor environment. The client computer 1 writes data read from the data storage server 2 to the virtual disk via the virtual bus, enabling data in the data storage server 2 to be taken out and used under a stand-alone condition under which the client computer 1 is disconnected from the in-house LAN 4 as shown in "B" in FIG. 2.

Figure 3:
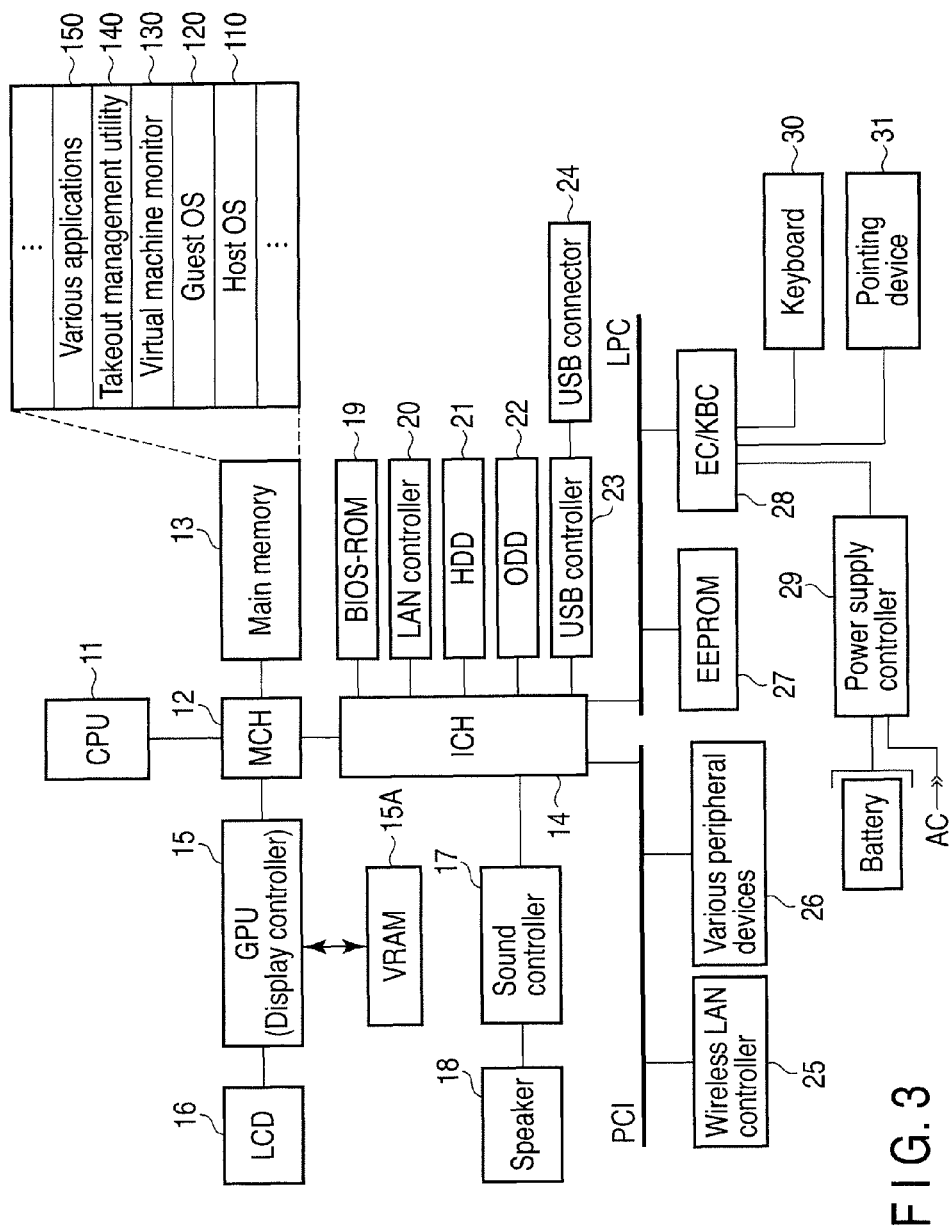
FIG. 3 is an exemplary view showing a system configuration of the client in the computer system of the embodiment.

FIG. 3 is an exemplary view showing a system configuration of the client computer 1 in the computer system of the embodiment.

As shown in FIG. 3, the client computer 1 includes a central processing unit (CPU) 11, a memory controller hub (MCH) 12, a main memory 13, an I/O controller hub (ICH) 14, a graphics processing unit (GPU) (display controller) 15, a video random access memory (VRAM) 15A, an LCD 16, a sound controller 17, a speaker 18, a Basic Input/Output System read-only memory (BIOS-ROM) 19, a LAN controller 20, an HDD 21, an optical disk drive (ODD) 22, a Universal Serial Bus (USB) controller 23, a USB connector 24, a wireless LAN controller 25, various peripheral units 26, an electrically erasable programmable ROM (EEPROM) 27, an embedded controller/keyboard controller (EC/KBC) 28, a power supply controller 29, a keyboard 30, and a pointing device 31.

The CPU 11, which is a processor that controls the operation of the client computer 1, executes various programs loaded from the HDD 21 or ODD 22 into the main memory 13. The various programs executed by the CPU 11 include a host OS 110, a guest OS 120, a virtual machine monitor 130, a takeout management utility program 140, and various application programs 150. These will be described later. The CPU 11 further executes a BIOS stored in the BIOS-ROM 19. The BIOS is a program for hardware control.

The MCH 12 functions not only as a bridge that connects the CPU 11 and the ICH 14 but also as a memory controller that executes access control of the main memory 13. The MCH 12 further includes the function of communicating with the GPU 15.

The GPU 15 is a display controller that controls the LCD 16 incorporated in the client computer 1. The GPU 15 includes the VRAM 15A and is equipped with an accelerator that draws images to be displayed by various programs in place of the CPU 11.

The ICH 14 includes an Integrated Device Electronics (IDE) controller for controlling the HDD 21 or ODD 22. The ICH 14 further controls the various peripheral devices 26 connected to a Peripheral Component Interconnect (PCI) bus. In addition, the ICH 14 also includes the function of communicating with the sound controller 17, LAN controller 20, and USB controller 23.

The sound controller 17, which is a sound source device, outputs audio data to be processed by various programs to the speaker 18 incorporated in the client computer 1. The LAN controller 20 is a wire communication device that executes wire communication complying with, for example, the IEEE 802.3 standard. More specifically, the LAN controller 20 executes data transmission and reception via the in-house LAN 4. The USB controller 23 executes communication with an external device conforming to, for example, the USB 2.0 standard (connected via the USB connector 24).

The wireless LAN controller 25 is a wireless communication device that executes wireless communication complying with, for example, the IEEE 802.11g standard. The EEPROM 27 is a memory device for storing, for example, individual data on the client computer 1. The EC/KBC 28 is a single-chip microprocessing unit (MPU) in which an embedded controller for managing power in cooperation with the power supply controller 29 and a keyboard controller for controlling data input according to the operation of the keyboard 30 or pointing device 31 have been integrated.

Figure 4:
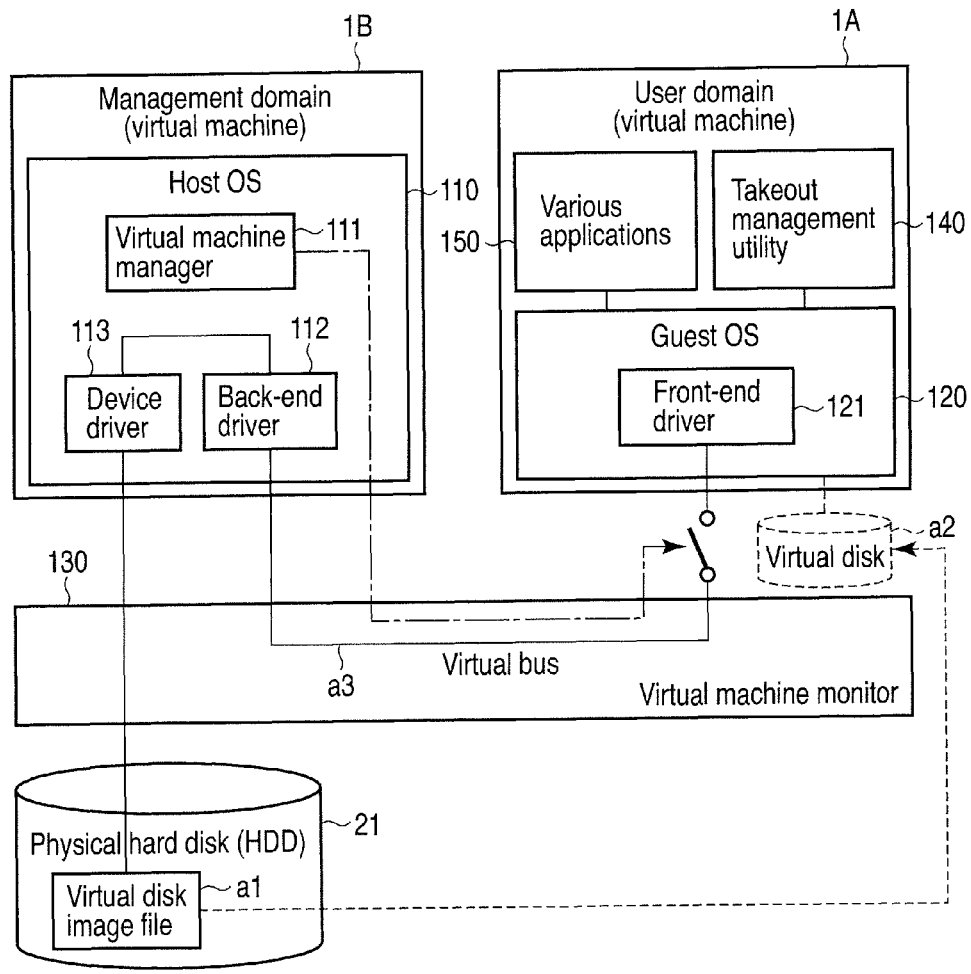
FIG. 4 is an exemplary view showing functional blocks related to taking out data in the client in the computer system of the embodiment.

Next, FIG. 4 shows functional blocks related to taking out data in the client computer 1 (supplied to each employee) which has the aforementioned system configuration.

As shown in FIG. 4, first, two virtual machine environments, user domain 1A and management domain 1B, are established on the client computer 1. User domain 1A is a virtual machine environment where a guest OS 120 (a first OS), such as Windows (registered trademark), which accepts a user operation and executes a user-used application program 150 operates. The user of the client computer 1 recognizes only the virtual machine environment of user domain 1A. In the guest OS 120, the authority to access a file or a directory (folder) on a file system is set to "unwritable."

In addition, on user domain 1A, the takeout management utility program 140 also operates under the control of the guest OS 120. The takeout management utility program 140 is a program which provides a graphical user interface (GUI) for transmitting the aforementioned takeout request to the takeout management server 3. In the guest OS 120, there is provided a front-end driver 121 described later.

Management domain 1B is a virtual machine environment where a host OS 110 (a second OS) that manages the guest OS 120 operates. The host OS 110 includes a virtual machine manager 111 described later, a back-end driver 112, and a device driver 113.

The virtual machine monitor 130 is a program for establishing the aforementioned virtual machine monitor environment (for virtualizing physical hardware). The virtual machine monitor 130 includes the function of providing a virtual bus for communication between two modules and connecting and disconnecting the virtual bus.

The two virtual machine environments (1A, 1B) and virtual machine monitor environment on the client computer 1 can be established by, for example, loading an installation optical disc in the ODD 22 at an initial start-up and turning on the client computer 1. In addition, the modules may be acquired from the data storage server 2 or the like via the in-house LAN 4 (by an installer stored on an installation optical disc) instead of acquiring from an installation optical disc. That is, the establishment of the various environments shown in FIG. 4 is not limited to a specific method and may be accomplished by any suitable known method.

Now, suppose the client computer 1 is connected to the in-house LAN 4. In this state, suppose a GUI provided by the takeout management utility program 140 transmits a takeout request to the takeout management server 3 and a permit (takeout permit) is sent back from the takeout management server 3.

Having received a permit issued by the takeout management server 3, the guest OS 120 (which controls the takeout management utility program 140) notifies the virtual machine manager 111 of the host OS 110 of the reception of the permit. The notice requires the transition from normal mode to takeout mode.

Having received the notice, the virtual machine manager 111 first creates a virtual disk image file a1 on the HDD 21 mounted on the client computer 1. Accessing to the HDD 21 in order to create the virtual disk image file a1 is executed via the device driver 113 in the host OS 110. Then, the virtual machine manager 111 instructs the virtual machine monitor 130 to show the virtual disk image file a1 as a partition (virtual disk a2) of the HDD 21 to the guest OS 120. As a result, on user domain 1A, the guest OS 120 recognizes the virtual disk image file a1 as if a device were added. The virtual machine monitor 130 does not virtualize at least the HDD 21 in connection with the host OS 110. That is, the host OS 110 sees the virtual disk image file a1 as merely a file on the HDD 21.

The virtual machine manager 111 issues, to the virtual machine monitor 130 at start-up, an instruction to provide a virtual bus a3 for enabling communication between the front-end driver 121 of the guest OS 120 and the back-end driver 112 of the host OS 110 and an instruction to bring the virtual bus a3 into a disconnected state. When having created the virtual disk image file a1 on the HDD 21, the virtual machine manager 111 issues an instruction to connect the virtual bus a3 to the virtual machine monitor 130.

The front-end driver 121 is a program provided in the guest OS 120 in order to access a specific device added on user domain 1A (more specifically, the virtual disk a2). The front-end driver 121 outputs an access command to the virtual disk a2 onto the virtual bus a3, when the virtual bus a3 has been enabled under the control of the virtual machine manager 111, an access command output from the front-end driver 121 is transferred to the back-end driver 112 of the host OS 110.

The back-end driver 112 is a program that converts an access command issued to the virtual disk a2 (by the front-end driver 121) into an access command issued to the HDD 21 to access the virtual disk image file a1, and issues the converted access command to the HDD 21 via the device driver 113. For example, data read from the data storage server 2 and written to the virtual disk a2 is written to the virtual disk image file a1 on the HDD 21.

Conversely, when an access command to read data from the virtual disk a2 is issued from the front-end driver 121, the back-end driver 121 converts the access command into an access command for the HDD 21 to access the virtual disk image file a1, and issues the converted access command to the HDD 21 via the device driver 113. The resulting data is taken over by the device driver 113 and back-end driver 112 and returned to the front-end driver 121 via the virtual bus a3.

As described above, when having received a permit (takeout permit) from the takeout management server 3, the client computer 1 can access the virtual disk a2 in the virtual machine environment of user domain 1A where the guest OS 120 operates. Therefore, when data read from the data storage server 2 is written onto the virtual disk a2, data in the data storage server 2 can be used even if the client computer 1 is disconnected from the in-house LAN 4.

The intervention of the host OS 110 enables the virtual disk a2 to be accessed. The guest OS 120 cannot access the virtual disk a2 directly. If the virtual bus a3 is in a disconnected state, the guest OS 120 (which accepts a user operation) cannot access the virtual disk a2. The connection/disconnection of the virtual bus a3 is controlled by the virtual machine manager 111 of the host OS 110, which assures security.

Figure 5:
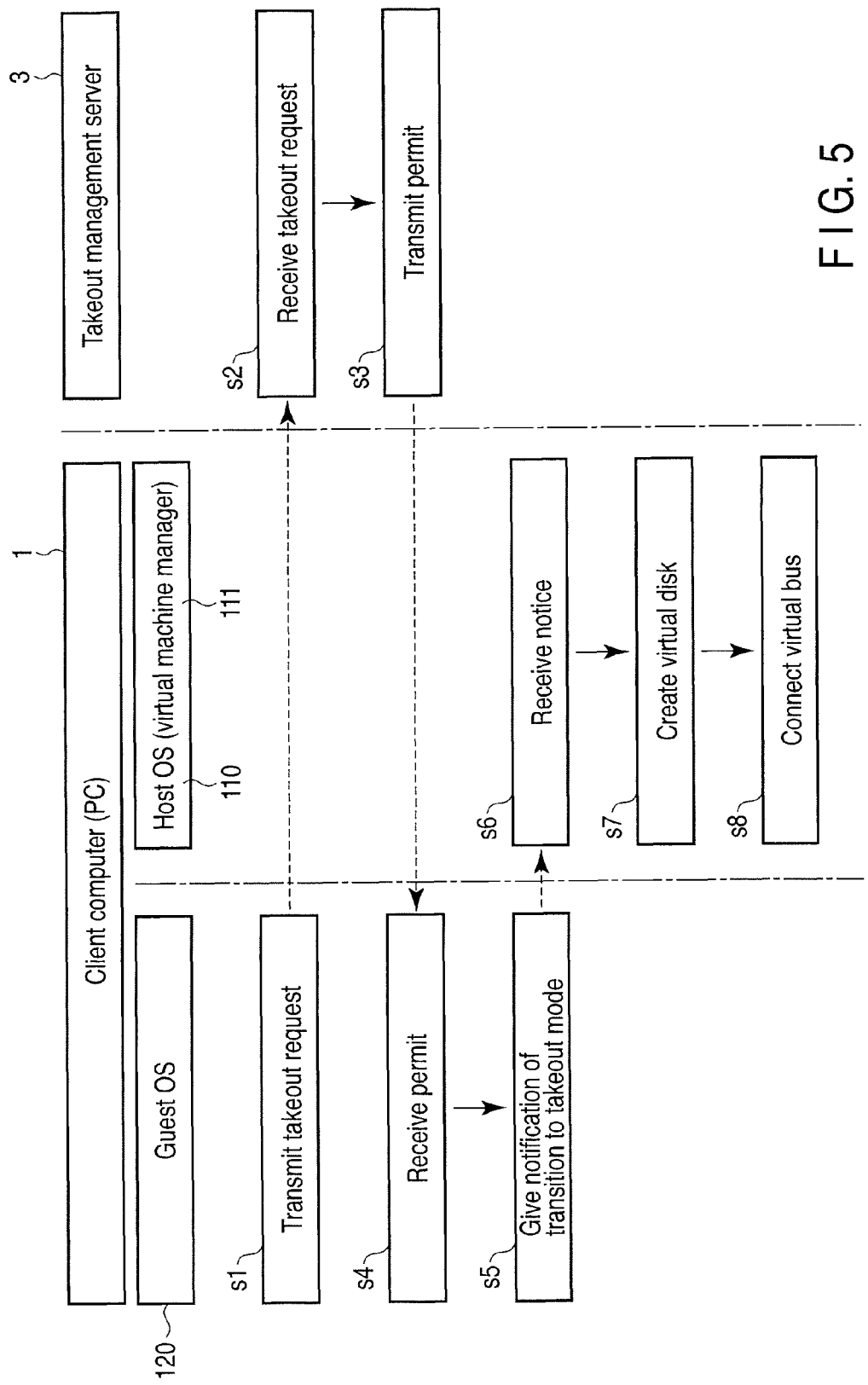
FIG. 5 is an exemplary timing chart showing a flow of processing related to taking out data in the computer system of the embodiment.

FIG. 5 is an exemplary timing chart showing a flow of processing related to taking out data in the computer system.

When an employee reads data from the data storage server 2 into the employee's client computer 1 and takes out the data, the employee operates to change from normal mode to takeout mode using the GUI provided by the takeout management utility program 140.

Then, the guest OS 120 of the client computer 1 transmits a takeout request to the takeout management server 3 (s1 in FIG. 5). Having received the takeout request (s2 in FIG. 5), the takeout management server 3 records, for example, identification data and time data about the requesting client computer 1, issues a permit that permits data in the data storage server 2 to be taken out, and sends back the permit to the client computer 1 (s3 in FIG. 5).

When having received the permit (s4 in FIG. 5), the guest OS 120 of the client computer 1 notifies the virtual machine manager 111 of the host OS 110 of transition to takeout mode (s5 in FIG. 5). Receiving the notice (s6 in FIG. 5), the virtual machine manager 111 of the host OS 110 creates a virtual disk image file a1 on the HDD 21 mounted on the client computer 1, and gives to the virtual machine monitor 130 an instruction to cause the virtual disk image file a1 to be seen as a disk (virtual disk a2) from the guest OS 120 (s7 in FIG. 5).

Then, after having created the virtual disk a2, the virtual machine manager 111 of the host OS 110 gives to the virtual machine monitor 130 an instruction to connect the virtual bus a3 (now in the disconnected state) for the guest OS 120 to access the virtual disk a2 via the host OS 110 (s8 in FIG. 5).

As described above, in the computer system, the client computer 1 creates the virtual disk a2 under the control of the host OS 110 on condition that the client computer 1 receives a permit (takeout permit) from the takeout management server 3, and enables the virtual bus a3 that allows the guest OS 120 to access the virtual disk a2 (or to communicate with the back-end driver 112 of the host OS 110).

This realizes a computer system which enables the client computer 1 to hold data acquired via the in-house LAN 4 under a specific condition, while assuring security.

The client computer 1 transmits a takeout request to the takeout management server 3 when changing from normal mode to takeout mode. In response to this, the takeout management server 3 records identification data, time data, and others about the requesting client computer 1, issues a permit that permits data in the data storage server 2 to be taken out, and sends back the permit to the client computer 1. In addition to this, the takeout management server 3 may cause time-limit data to be included in the permit. The time-limit data may have the same value for all the client computers 1 or be caused to differ in value from one client computer 1 to another by using a table or the like on the takeout management server 3 side.

When the client computer 1 has received the permit, the virtual machine manager 111 of the host OS 110 creates a virtual disk a2 and executes the process of enabling a virtual bus a3 that allows the guest OS 120 to access the virtual disk a2. In addition to this, the virtual machine manager of the host OS 110 measures elapsed time since the permit was received, and when the value has reached a value specified by time-limit data included in the permit, gives to the virtual machine monitor 130 an instruction to disconnect the virtual bus a3.

When the virtual bus a3 has been disconnected, the guest OS 120 cannot access the virtual disk a2, which increases security. The virtual disk image file a1 created on the HDD 21, that is, the virtual disk a2, can be dealt with in one of the following two ways: (1) the virtual disk image file a1 is deleted when the time limit has elapsed (the virtual disk image file a1 on the HDD 21 is deleted) and (2) the virtual disk image file a1 is caused to remain as it is. When the virtual disk a2 is caused to remain, the previously used virtual disk a2 can be used again if the client computer 1 is returned to normal mode and then is changed from normal mode to takeout mode again. In this case, the virtual machine manager 111 of the host OS 110 checks whether a virtual disk image file a1 has already existed on the HDD 21. If it has existed on the HDD 21, the virtual machine manager 111 does not create a new virtual disk image file a1 and gives to the virtual machine monitor 130 an instruction to cause the existing virtual disk image file a1 to be seen as a virtual disk a2 from the guest OS 120.

In the choice of (1) the virtual disk image file a1 is deleted and (2) the virtual disk image file a1 is caused to remain as it is, either one may be used fixedly. Alternatively, the user may be allowed to set either one of the two choices by use of a GUI provided by the takeout management utility program 140.

In the explanation so far, the client computer 1 has changed from normal mode to takeout mode. The following is an explanation of various examples of a case where the client computer 1 in takeout mode is returned to normal mode.

When the client computer 1 (in takeout mode) is connected to the in-house LAN 4 again, a specific authentication process for connecting to the in-house LAN 4 is executed under the control of the guest OS 120, for example. When the host OS 110 that manages the guest OS 120 has detected reconnection to the in-house LAN 4 as a result of the authentication process, the virtual machine manager 111 executes the process of returning from takeout mode to normal mode.

More specifically, firstly, the virtual machine manager 111 executes the process of giving an instruction to disconnect the virtual bus 13 to the virtual machine monitor 130. This makes it impossible to load data read from the data storage server 2 after that into the client computer 1.

Secondly, the virtual machine manager 111 subjects the virtual disk a2 to one of the following processes: (1) the virtual disk a2 is directly deleted (or the virtual disk image file a1 on the HDD 21 is deleted), (2) the virtual disk a2 is caused to remain as it is, (3) the data stored in the virtual disk image file a1 on the HDD 21 is saved to a specific region of the data storage server 2 and the virtual disk a2 is caused to remain as it is, and (4) the data stored in the virtual disk image file a1 on the HDD 21 is saved to a specific region of the data storage server 2 and then the virtual disk a2 is deleted.

When the virtual disk a2 is caused to remain, the previously used virtual disk a2 can be used again if the mode is changed to takeout mode as when the time limit has elapsed. The data can be saved to the specific region of the data storage server 2 by, for example, creating a directory (folder) for the entire virtual disk image file a1 in a predetermined region in the data storage server 2 and storing each data item stored in the virtual disk image file a1 in the directory. In this case, too, the data can be used again by reading the data again from the data storage server 2 to the virtual disk a2 when the mode is changed to takeout mode.

As when the time limit has elapsed, the way the virtual disk a2 is dealt with may be fixed to one of the following: (1) the virtual disk a2 is directly deleted, (2) the virtual disk a2 is caused to remain as it is, (3) the data stored in the virtual disk image file a1 on the HDD 21 is saved to a specific region of the data storage server 2 and the virtual disk a2 is caused to remain as it is, and (4) the data stored in the virtual disk image file a1 on the HDD 21 is saved to a specific region of the data storage server 2 and then the virtual disk a2 is deleted. Alternatively, the user may be allowed to set one of the above ways with a GUI provided by the takeout management utility program 140.

Furthermore, a data synchronizing process may be executed as follows: whether the taken-out data has been updated is checked by reading the data to the virtual disk a2; if the data has been updated, the old data in the data storage server 2 is updated to new data on the virtual disk a2.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A computer system comprising:
   a server; and
   a client computer comprising a disk device and the client computer is connected to the server via a network,
   wherein:
   the server comprises a takeout management module configured to issue a permit to the client computer when a takeout request is received from the client computer, the permit permitting the client computer to store data from a storage server to the disk device, the takeout request requesting using of data acquired from the storage server connected to the network under a condition of being disconnected from the network, and
   the client computer comprises:
   a first virtual machine environment where a first operating system (OS) and a takeout management utility operate, the first OS comprising a front end driver and the takeout management utility operating under the first OS;

a second virtual machine environment where a second OS operates, the second OS managing the first OS and comprising a back-end driver and a security protector; and a takeout request transmitter configured to transmit the takeout request generated by the takeout management utility operating under the first OS to the server, and wherein the security protector configured to create a virtual disk image file on the disk device, and to connect a virtual bus for communication between the front-end driver and the back-end driver to access the virtual disk image file and store data acquired from the storage server connected to the network to the virtual disk image file by using the virtual bus, when the permit is received from the server.

2. The system of claim 1, wherein the client computer comprises:

the first virtual machine environment where the first OS operates, the first OS comprises the front-end driver configured to issue an operation command for controlling a predetermined device with a storage; and a virtual machine monitor environment configured to execute virtualization processing for causing the first OS and the second OS to recognize devices comprising the disk device, wherein the second OS comprises:

the back-end driver configured to receive the operation command issued by the front-end driver, and a device driver configured to issue the operation command received by the back-end driver to the disk device, and the security protector is configured to:

instruct the virtual machine monitor environment to cause the first OS to recognize the created virtual disk image file on the disk device as the predetermined device, and instruct the virtual machine monitor environment to connect the virtual bus for communication between the front-end driver of the first OS and the back-end driver of the second OS so that writing data under the control of the first OS is executable.

3. The system of claim 2, wherein the back-end driver comprises a converter configured to convert the operation command issued by the front-end driver for the predetermined device into an operation command for the disk device in order to access the virtual disk image file.

4. The system of claim 2, wherein:

the permit comprises time limit data indicating a time limit allowing the client computer to store data, and the security protector is configured to instruct the virtual machine monitor environment to disconnect the virtual bus in order to prevent data from being written and read under the control of the first OS, when the time limit indicated by the time limit data in the permit elapses after the permit is received from the server.

5. The system of claim 4, wherein the security protector is configured to delete the virtual disk image file on the disk device when the security protector disconnects the virtual bus.

6. The system of claim 2, wherein the security protector is configured to instruct the virtual machine monitor environment to disconnect the virtual bus in order to prevent data from being written and read under the control of the first OS when the client computer is connected to the network again.

7. The system of claim 6, wherein the security protector is configured to delete the virtual disk image file on the disk device when the security protector disconnects the virtual bus.

8. The system of claim 2, further comprising a second server connected to the network, wherein the security protector comprises a data management module configured to save data stored in the virtual disk image file on the disk device in the second server when the client computer is connected to the network again.

9. The system of claim 8, wherein the security protector is configured to delete the virtual disk image file on the disk device after the security protector saved the data stored in the virtual disk image file on the disk device to the second server.

10. The system of claim 2, wherein the security protector is configured to instruct the virtual machine monitor environment to cause the first OS to recognize an existing virtual disk image file as the predetermined device, when the virtual disk image file already exists on the disk device.

11. An information processing apparatus connected to a server via a network, comprising:

a processor;

a disk device;

a first virtual machine environment where a first operating system (OS) and a takeout management utility operate, the first OS comprising a front end driver and the takeout management utility operating under the first OS;

a second virtual machine environment where a second OS operates, the second OS managing the first OS and comprising a back-end driver and a security protector; and a takeout request transmitter configured to transmit a takeout request generated by the takeout management utility operating under the first OS to a takeout management module of the server, the takeout request requesting using of data acquired from a storage server to the disk device via the network under a condition of being disconnected from the network, wherein the takeout management module of the server is configured to permit the information processing apparatus to store data acquired from the storage server in the disk device of the information processing apparatus, and wherein the security protector is configured to create a virtual disk image file on the disk device and to connect a virtual bus for communication between the front-end driver and the back-end driver to access the virtual disk image file and store data acquired from the storage server via the network to the virtual disk image file by using the virtual bus, when a permit is received from the server.

12. The apparatus of claim 11, further comprising:

the first virtual machine environment where the first OS operates, the first OS comprises the front-end driver configured to issue an operation command for controlling a predetermined device with a storage; and a virtual machine monitor environment configured to execute virtualization processing for causing the first OS and the second OS to recognize devices comprising the disk device, wherein:

the second OS comprises:

the back-end driver configured to receive the operation command issued by the front-end driver, and a device driver configured to issue the operation command received by the back-end driver to the disk device, and the security protector is configured to:
  instruct the virtual machine monitor environment to cause the first OS to recognize the created virtual disk image file on the disk device as the predetermined device, and
  instruct the virtual machine monitor environment to connect the virtual bus for communication between the front-end driver of the first OS and the back-end driver of the second OS so that writing data under the control of the first OS is executable.

13. The apparatus of claim 12, wherein the back-end driver comprises a converter configured to convert the operation command issued by the front-end driver for the predetermined device into an operation command for the disk device in order to access the virtual disk image file.

14. The apparatus of claim 12, wherein:
  the permit comprises time limit data indicating a time limit allowing the client computer to store data, and
  the security protector is configured to instruct the virtual machine monitor environment to disconnect the virtual bus in order to prevent data from being written and read under the control of the first OS, when the time limit indicated by the time limit data in the permit elapses after the permit is received from the server.

15. The apparatus of claim 14, wherein the security protector is configured to delete the virtual disk image file on the disk device when the security protector disconnects the virtual bus.

16. The apparatus of claim 12, wherein the security protector is configured to instruct the virtual machine monitor environment to disconnect the virtual bus in order to prevent data from being written and read under the control of the first OS when the client computer is connected to the network again.

17. The apparatus of claim 16, wherein the security protector is configured to delete the virtual disk image file on the disk device when the security protector disconnects the virtual bus.

18. The apparatus of claim 12, wherein the security protector is configured to instruct the virtual machine monitor environment to cause the first OS to recognize an existing virtual disk image file as the predetermined device without newly creating the virtual disk image file, when the virtual disk image file already exists on the disk device.

19. A security protection method of an information processing apparatus which comprises a disk device and is connected to a server via a network, the method comprising:
  transmitting a takeout request to a takeout management module of the server, the takeout request, generated by a takeout management utility operating under a first operating system (OS) of the information processing apparatus, requesting using of data acquired from a storage server to the disk device via the network under a condition of being disconnected from the network;
  receiving, by the information processing apparatus, a permit from the takeout management module of the server in response to the takeout request, the permit allowing the information processing apparatus to store data acquired from the storage server to the disk device of the information processing apparatus, wherein the information processing apparatus comprises a first virtual machine environment and a second virtual machine environment, the first virtual machine environment where the first OS and the takeout management utility operates and the first OS comprising a front end driver and the takeout management utility operating under the first OS, and the second virtual machine environment where a second OS operates, the second OS managing the first OS and comprising a back-end driver and a security protector; and
  creating a virtual disk image file on the disk device by the security protector and connecting a virtual bus for communication between the front-end driver and the back-end driver to access the virtual disk image file and storing data acquired from the storage server via the network to the virtual disk image file by using the virtual bus, when the permit is received from the server.

* * * * *